United States Patent
Scherer et al.

(10) Patent No.: US 8,686,103 B2
(45) Date of Patent: Apr. 1, 2014

(54) WATER BORNE COATING COMPOSITION CONTAINING THIOL FUNCTIONAL COMPOUNDS

(75) Inventors: Taco Scherer, Haarlem (NL); Michèle Louis Van Wijk, Leiden (NL); Petrus Johannes Arnoldus Geurink, Voorhout (NL); Nicolette De Wijs-Rot, s'Hertogenbosch (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 824 days.

(21) Appl. No.: 11/793,481

(22) PCT Filed: Dec. 15, 2005

(86) PCT No.: PCT/EP2005/056808
§ 371 (c)(1),
(2), (4) Date: Sep. 7, 2007

(87) PCT Pub. No.: WO2006/064035
PCT Pub. Date: Jun. 22, 2006

(65) Prior Publication Data
US 2008/0119612 A1 May 22, 2008

Related U.S. Application Data

(60) Provisional application No. 60/644,038, filed on Jan. 18, 2005.

(30) Foreign Application Priority Data

Dec. 15, 2004 (EP) .................................. 04078404

(51) Int. Cl.
*C08G 18/28* (2006.01)

(52) U.S. Cl.
USPC ............................................................ 528/85

(58) Field of Classification Search
USPC ........................................................ 525/123
See application file for complete search history.

(56) References Cited

U.S. PATENT DOCUMENTS 4,031,050 A * 6/1977 Jerabek ........................ 523/415
4,788,083 A 11/1988 Dammann et al.
(Continued)

FOREIGN PATENT DOCUMENTS

EP   0 276 667   8/1988
EP   0 448 224   9/1991
(Continued)

OTHER PUBLICATIONS

International Search Report, PCT International Patent Application No. PCT/EP2005/056808, dated Feb. 22, 2006.
(Continued)

*Primary Examiner* — Mike M Dollinger
(74) *Attorney, Agent, or Firm* — Kenyon & Kenyon LLP

(57) ABSTRACT

The invention relates to a water borne coating composition comprising a) a polyol, b) a polyisocyanate crosslinker, and c) a thiol functional compound, wherein the molar ratio of isocyanate groups to thiol groups ranges between 1:0.0001 and 1:0.4. The invention further relates to the use of the coating composition, and to a kit of parts for preparation of the coating composition. The coating composition according to the invention displays a balance of high curing rate, long pot life, and good film appearance of the coating prepared from it.

14 Claims, 3 Drawing Sheets

(56) References Cited

U.S. PATENT DOCUMENTS

| | | | |
|---|---|---|---|
| 5,075,370 A * | 12/1991 | Kubitza et al. | 524/591 |
| 5,331,039 A * | 7/1994 | Blum et al. | 524/507 |
| 5,594,065 A * | 1/1997 | Tien et al. | 524/507 |
| 5,820,925 A | 10/1998 | Fenn et al. | |
| 6,124,380 A * | 9/2000 | Bossert et al. | 523/404 |
| 6,306,947 B1 * | 10/2001 | Morishima et al. | 524/457 |
| 6,384,131 B1 * | 5/2002 | Kinney et al. | 524/591 |
| 2002/0123600 A1 | 9/2002 | Van Den Berg et al. | |

FOREIGN PATENT DOCUMENTS

| | | |
|---|---|---|
| EP | 0 454 219 | 10/1991 |
| EP | 0 794 204 | 9/1997 |
| JP | 09003400 A * | 1/1997 |
| WO | 93/17060 | 9/1993 |
| WO | 00/39181 | 7/2000 |
| WO | 00/49100 | 8/2000 |
| WO | 00/59977 | 10/2000 |
| WO | 01/81441 | 11/2001 |
| WO | 01/92362 | 12/2001 |

OTHER PUBLICATIONS

European Search Report, European Application No. EP 04 07 8404, dated May 13, 2005.

* cited by examiner

WATER BORNE COATING COMPOSITION CONTAINING THIOL FUNCTIONAL COMPOUNDS

REFERENCE TO RELATED APPLICATION(S)

This application claims the benefit of U.S. Provisional Application No. 60/644,038 filed on Jan. 18, 2005.

The invention relates to a water borne coating composition comprising a polyol and a polyisocyanate crosslinker, to the use of the coating composition, and to a kit of parts for preparation of the coating composition.

A coating composition of the above-mentioned type is known from international patent publication WO 01/81441. This publication describes a composition comprising as the polyol a branched polyester polyol which is characterized by specific carboxylic acids and alcohols as raw materials. The composition of WO 01/81441 can be used as clear coat or as pigmented coating.

Although it has been found that an acceptable curing rate and pot life can be obtained with the composition of WO 01/81441, there is a need to provide such coating compositions having an improved balance of curing rate, pot life, and film appearance of coatings.

The curing rate of such compositions can be increased to a desirable level by the addition of curing catalysts, which accelerate the isocyanate hydroxyl polyaddition reaction. Suitable curing catalysts are known from international patent publication WO 00/39181 and include organo-metal catalysts and tertiary amines. Well-known examples of curing catalysts are organo-tin compounds, such as dimethyl tin dilaurate, dibutyl tin dilaurate, dioctyl tin dilaurate, and tin octoate.

However, the increase in curing rate as a result of the application of curing catalysts is attended with a corresponding, undesirable decrease of the pot life of the multi-pack compositions. Furthermore, the curing catalysts catalyze both the reaction of isocyanate groups with hydroxyl groups of the film-forming binder and the reaction of isocyanate groups with water. The latter reaction generates carbon dioxide gas, which leads to imperfections in the coating film and which detracts from the film appearance.

International patent publication WO 00/49100 discloses a water borne film-forming composition comprising a hydroxyl-functional acrylate copolymer and a crosslinking material. The crosslinking material is selected from aminoplasts, triazines, and polyisocyanates. The preferred crosslinking material is a mixture of partially alkylated melamine formaldehyde condensates and a carbamoyl triazine. In the case of an isocyanate crosslinking agent, a blocked isocyanate is preferred. Furthermore, the composition of this publication may comprise an amphiphilic adjuvant. Said adjuvant has one or more hydrophilic terminal groups at its polar end. The hydrophilic groups are selected from hydroxyl groups, carbamate groups, amide groups, urea groups, and mercaptan groups, hydroxyl groups being preferred.

The use of a blocked isocyanate as taught by this publication may lead to a long pot life and may minimize the film imperfections caused by carbon dioxide formation as described above. However, WO 00/49100 is silent about the balance of curing rate, pot life, and good appearance of the coating layer. International patent publication WO 01/92362 relates to a photoactivatable coating composition comprising a photolatent base, at least one polyisocyanate, and at least one compound containing isocyanate reactive groups, wherein the isocyanate reactive groups comprise at least one thiol group. The photoactivatable coating composition may be water borne.

It is the object of the current invention to provide a water borne coating composition comprising a polyol and a polyisocyanate crosslinker which offers a good balance of curing rate, also in the absence of ultraviolet radiation, at 5-80° C., pot life, and film appearance of the coating.

The object of the invention is achieved with an aqueous coating composition according to the opening paragraph, wherein the coating composition comprises a thiol-functional compound and wherein the molar ratio of isocyanate groups to thiol groups ranges between 1:0.0001 and 1:0.4.

It should be noted that U.S. Pat. No. 4,788,083 describes thiol blocked tin or bismuth catalysts for isocyanate hydroxyl addition reactions in solvent borne compositions. However, the possibility to use the disclosed catalysts in water borne coatings is neither mentioned nor suggested in this publication.

The coating composition according to the invention displays a balance of high curing rate, long pot life, and good film appearance of the coating prepared from it which is superior to that of the prior art compositions known from WO 01/81441.

Figure 1:
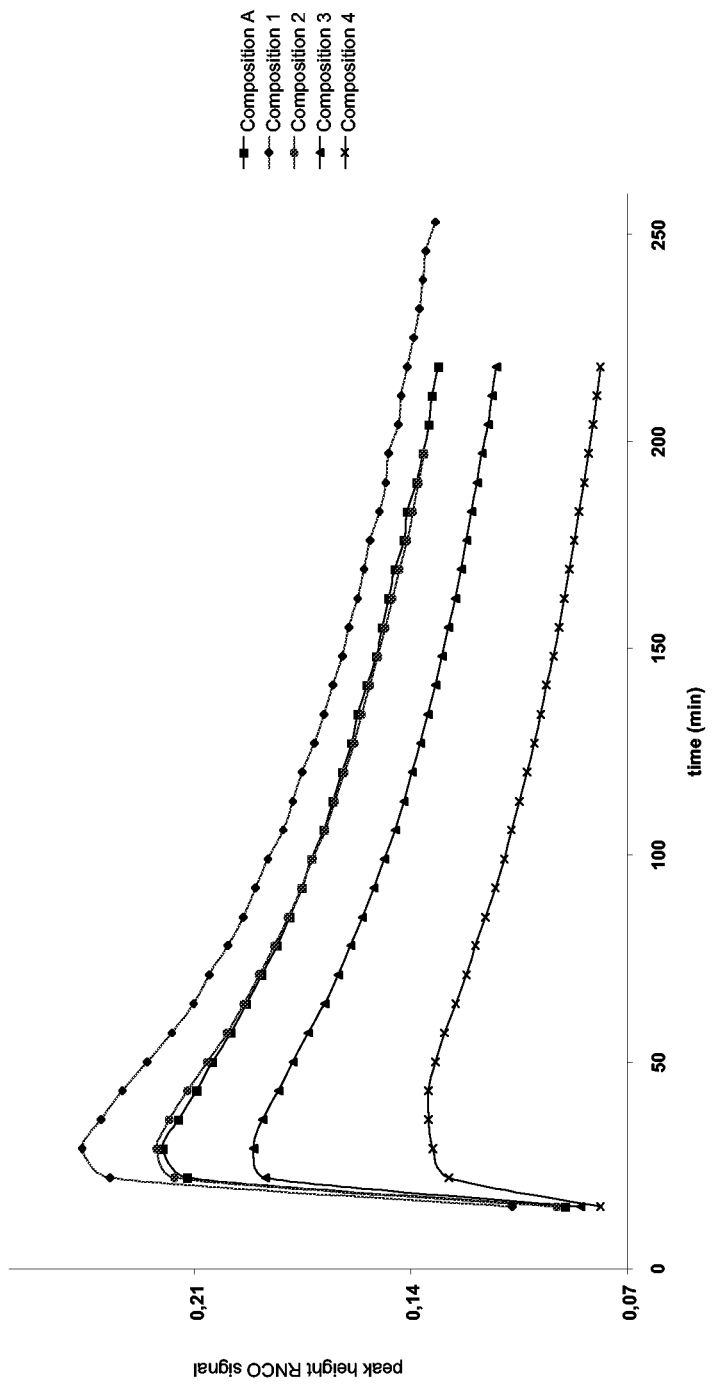
FIG. 1 is a graphic representation of the results of the curing speed experiment with coating compositions A and 1-4.

Suitable polyols to be used in the water borne coating composition include polyester polyols, polyacrylate polyols, polyurethane polyols, and mixtures and hybrids thereof.

Polyester Polyols

The polyester polyols can be prepared according to generally known methods by the polyesterification of polycarboxylic acids, their anhydrides or dialkyl esters with polyalcohols. Optionally, mono-functional acids, monoalcohols and/or hydroxy-functional acids and/or epoxy compounds may be used as co-reactants. The reaction to form the polyester polyols can be conducted in one or more stages.

The polyester polyols suitably have a number average molecular weight in the range of 300 to 15,000, or 500 to 8,000, or 1,000 to 4,000. In order to achieve hydroxyl functionality in the resulting polyester polyols, a stoichiometric excess of the hydroxyl component can be used. The polyester polyols suitably have a hydroxyl number in the range of 15 to 500 mg KOH/g, or 25 to 300 mg KOH/g, or 50 to 250 mg KOH/g, or 100 to 220 mg KOH/g. The polyester polyols generally have a hydroxyl functionality of >2, for example a hydroxyl functionality of >2.3, or a hydroxyl functionality of >2.5. In order to achieve hydroxyl functionalities >2, the polyester polyols suitably have a branched structure.

In order to obtain a branched polyester polyol, the condensation reaction is carried out in the presence of a branching agent, which may be a tri- or higher-functional acid and/or alcohol. The tri- or higher-functional acid may suitably be selected from the group of trimellitic acid and pyromellitic acid or the anhydride thereof. The tri- or higher-functional polyalcohol may suitably be selected from the group of 1,1,1-trimethylol propane, 1,1,1-trimethylol ethane, 1,2,3-trimethylol propane, pentaerythritol, and mixtures thereof. In a particular embodiment a tri- or higher-functional polyalcohol is used, such as 1,1,1-trimethylol propane.

Further examples of polycarboxylic acids or reactive derivatives thereof that can be used for the preparation of suitable polyester polyols are phthalic anhydride, isophthalic acid, terephthalic acid, hexahydrophthalic anhydride, 1,4-cyclohexane dicarboxylic acid dimethylester, dimethyl terephthalate, tetrahydrophthalic anhydride, maleic anhydride, succinic anhydride, adipic acid, dimeric acid, azelaic acid, sebacic acid, lithium, sodium, potassium or amine salts of 5-sulphoisophthalic acid, and dimethyl sulphoisophthalic acid, and mixtures thereof.

Examples of monocarboxylic acids that can be used for the preparation of suitable polyester polyols are benzoic acid, tert. butyl benzoic acid, sulphobenzoic acid, lithium, sodium, potassium or amine salts of sulphobenzoic acid, and saturated acids, for example, linear acids with 5-18 carbon atoms; isononanoic acid, 2-ethylhexanoic acid, decanoic acid, dodecanoic acid, pivalic acid, unsaturated acids such as soybean fatty acids, dehydrated castor oil fatty acids, tall oil fatty acids, etc., and mixtures of these monocarboxylic acids.

Carboxylic acids with more than 6 carbon atoms are generally suitable. Examples of hydroxy-functional acids that can be used for the preparation of suitable polyester polyols are dimethylol propionic acid, hydroxypivalic acid, castor oil fatty acids, 12-hydroxystearic acid, 5-hydroxy-pentanoic acid or its lactone.

Further examples of polyalcohols that can be used for the preparation of suitable polyester polyols are ethylene glycol, propylene glycol, neopentyl glycol, 2-butyl-2-ethyl-1,3-propane diol, 1,6-hexane diol, cyclohexane dimethanol, glycerol, di-trimethylol propane, di-pentaerythritol, and mixtures thereof. Examples of monoalcohols that can be used for the preparation of suitable polyester polyols are n-hexanol, cyclohexanol, tert. butyl cyclohexanol, benzyl alcohol, stearyl alcohol, dodecanol, and mixtures thereof. Alcohols with at least 4 carbon atoms are generally suitable.

Examples of epoxy-functional compounds are the glycidyl ester of α-branched monocarboxylic acids, epoxidized vegetable oils, polyglycidyl ethers of polyalcohols or polyphenols, and polyglycidyl esters of polycarboxylic acids.

Suitable polyester polyols may comprise ionic and/or non-ionic stabilizing groups. Alternatively or additionally the polyester polyols can be stabilized in an aqueous medium by external emulsifiers. Such emulsifiers may be monomeric, oligomeric or polymeric compounds and are well known in the art. Examples of ionic stabilizing groups are carboxylate groups and sulphonate groups, non-ionic stabilizing groups can be polyalkylene oxide groups.

The polyester polyols suitably have a carboxylic acid number of ≤40 mg KOH/g (≤0.713 meq COOH groups per g of polyol), or ≤20 mg KOH/g (≤0.357 meq COOH groups per g of polyol). In particular, the polyester polyols have a carboxylic acid number of 5 to 15 mg KOH/g (0.089 to 0.268 meq COOH groups per g of polyol). Optionally, the polyester polyols may have a sulphonate number of ≤4 mg KOH/g (≤0.070 meq sulphonate groups per g of polyol). The polyester polyols may for example have a sulphonate number of 0.5 to 4 mg KOH/g (0.009 to 0.070 meq sulphonate groups per g of polyol), or 1 to 3 mg KOH/g (0.0175 to 0.0525 meq sulphonate groups per g of polyol). Alternatively, the polyester polyols can have a carboxylic acid number of less than 10 mg KOH/g (less than 0.178 meq COOH groups per g of polyol), for example between 5 and 9 mg KOH/g (0.089 to 0.161 meq COOH groups per g of polyol), and a sulphonate number of at least 0.5 mg KOH/g (at least 0.009 meq sulphonate groups), for example 1 to 3 mg KOH/g (0.0175 to 0.0525 meq sulphonate groups per g of polyol).

The introduction of the carboxylic acid groups or carboxylate groups into the polyester polyols can be achieved by incomplete esterification of the carboxylic groups of the polycarboxylic and/or hydroxy-functional acid monomers.

Sulphonic acid groups and/or sulphonate groups can be introduced into the polyester polyols by co-condensation of carboxylic acids and/or alcohols comprising sulphonic acid groups and/or sulphonate-functional groups, for example, the lithium, sodium, potassium, and amine salts of 5-sulphoisophthalic acid, sulphobenzoic acid, and 2-hydroxyethane sulphonic acid.

Non-ionic stabilizing groups can comprise $C_1$-$C_4$ alkoxy polyalkylene oxide groups. Suitable alkylene oxide groups are ethylene oxide groups, but propylene oxide groups or mixtures of ethylene oxide and propylene oxide groups are useful as well. For example, the alkylene oxide groups may be $C_1$-$C_4$ alkoxy ethers of polyalkylene glycols with the structure:

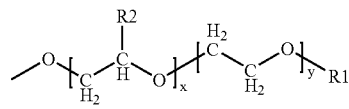

wherein R1 is a hydrocarbon group with 1 to 4, or 1 or 2, carbon atoms; R2 is a methyl group; x is between 0 and 40, or between 0 and 20, or between 0 and 10; y is between 0 and 50, and x+y is between 2 and 50, or between 2 and 25. Examples are $C_1$-$C_4$ alkoxy poly$C_2$($C_3$)alkylene oxide glycol and/or $C_1$-$C_4$ alkoxy poly$C_2$($C_3$)alkylene oxide 1,3-diol, wherein poly$C_2$($C_3$)alkylene oxide stands for polyethylene oxide, optionally comprising propylene oxide units. The polyester polyol suitably comprises 2.5 to 15 wt. % $C_1$-$C_4$ alkoxy polyalkylene oxide groups with a number average molecular weight of 500 to 3,000, or between 500 and 1,500, or between 500 and 1,250. A suitable polyester polyol may comprise 5 to 10 wt. % of $C_1$-$C_4$ alkoxy polyalkylene oxide groups. Good results are obtained with polyester polyols wherein the polyalkylene oxide groups are polyethylene oxide groups.

Suitable compounds comprising $C_1$-$C_4$ alkoxy polyalkylene oxide groups contain at least one hydroxyl group. Examples are methoxy poly$C_2$($C_3$)alkylene oxide glycols and methoxy poly$C_2$($C_3$)alkylene oxide-1,3-diols, such as Tegomer® D-3123 (PO/EO=15/85; Mn=1,180), Tegomer® D-3409 (PO/EO=0/100; Mn=2,240), and Tegomer® D-3403 (PO/EO=0/100; Mn=1,180) available from Goldschmidt AG, Germany, and MPEG 750 and MPEG 1000.

The introduction of the compounds comprising $C_1$-$C_4$ alkoxy polyalkylene oxide groups into the polyester polyols can be conducted by co-condensation in the polyesterification reaction.

If desired, the polyester polyols may contain a proportion of carbonylamino linking groups —C(=O)—NH— (i.e. amide linking groups) by including an appropriate amino-functional reactant as part of the "hydroxyl component". Such amide linkages are in fact useful in that they are more hydrolysis-resistant and more hydrophilic.

The polyester polyols can be modified, for example, with polyisocyanates to form urethanes. It is to be understood that the modification is conducted so as to avoid gelation and to retain hydroxyl functionality. The modification reaction optionally is carried out in the presence of compounds comprising hydroxy and/or isocyanate reactive amine groups, for example, neopentyl glycol, 1,6-hexane diol, 2-butyl-2-ethyl-1,3-propane diol, 1,3-trimethylol propane, ethylene glycol, 2-ethylhexanol, benzyl alcohol, ethanolamine, N-methyl ethanolamine, linear or branched polyester polyols, polyether polyols such as polyethylene glycols, polypropylene glycols, ethoxylated trimethylol propane, propoxylated pentaerythritol, monoalkyl ethers of polyethylene or polypropylene glycols, polyacrylic polyols, epoxy polyols, and polyurethane polyols.

The polyester polyols can also be modified by the copolymerization of olefinically unsaturated monomers such as styrene, alkyl acrylates, olefinically unsaturated monomers containing carboxylic acid, carboxylate, sulphonic acid, sulphonate-functional groups, and/or alkyl methacrylates, hydroxyalkyl acrylates, hydroxyalkyl methacrylates, and glycidyl methacrylate to form polyester-acrylic hybrids.

At the end of the polycondensation reaction in which the polyester polyol is formed the acid groups of the polyester polyol are at least partially neutralized with a neutralizing agent, after which water is added, for example to the hot melt at a temperature starting at 100° to 110° C., after which the temperature is gradually lowered to ambient temperature.

Examples of neutralizing agents include alkali metal hydroxides, such as sodium hydroxide, potassium hydroxide, or lithium hydroxide, ammonia, and amines. Suitable amines include primary, secondary, and tertiary amines. Suitable primary amines are, for example, isopropyl amine, butyl amine, ethanol amine, 3-amino-1-propanol, 1-amino-2-propanol, 2-amino-2-methyl-1-propanol or 2-amino-2-methyl-1,3-propane diol. Secondary amines that can be used are, for example, morpholine, diethyl amine, dibutyl amine, N-methyl ethanol amine, diethanol amine, or diisopropanol amine. Examples of suitable tertiary amines include trimethyl amine, triethyl amine, triisopropyl amine, triisopropanol amine, N,N-dimethyl ethanol amine, dimethyl isopropyl amine, N,N-diethyl ethanol amine, 1-dimethyl amino-2-propanol, 3-dimethyl amino-1-propanol, 2-dimethyl amino-2-methyl-1-propanol, N-methyl diethanol amine, N-ethyl diethanol amine, N-butyl diethanol amine, N-ethyl morpholine. Tertiary amines are very suitable, for example N,N-dimethyl ethanol amine.

The aqueous polyester polyol dispersions obtained in this manner can have a solids content of more than 30 wt. %, such as 35 to 65 wt. %, or 40 to 60 wt. %, at a viscosity of up to 5 Pa·s, or 0.1 to 3 Pa·s. The average particle size of the thus obtained dispersions is in the range of 30 to 300 nm, or in the range of 50 to 200 nm. The thus obtained dispersions have a pH between 6 and 9, or between 6.5 and 8.

Polyacrylate Polyols

The polyacrylate polyols can be prepared by polymerization of suitable ethylenically unsaturated monomers in organic solution or by aqueous emulsion polymerization. The polymerization can be carried out in one or more stages. Examples of suitable processes for the preparation of polyacrylate polyols are described in WO 00/39181.

The polyacrylate polyols suitably have a hydroxyl value between 25 and 500 mg KOH/gram polyol, or between 50 and 300 mg KOH/gram polyol, or between 50 and 200 mg KOH/gram polyol. The hydroxyl value may be between 75 and 200 mg KOH/gram polyol. The polyols have two or more hydroxy groups per molecule, for example three or more.

Examples of suitable ethylenically unsaturated hydroxyl-functional monomers that can be used for the preparation of polyacrylate polyols for a coating composition according to the invention are acrylates and methacrylates, such as 2-hydroxybutyl(meth)acrylate, 3-hydroxybutyl(meth)acrylate, or 2-hydroxyethyl(meth)acrylate, 2-hydroxypropyl(meth)acrylate, 3-hydroxypropyl(meth)acrylate, and 4-hydroxybutyl (meth)acrylate. A further group of suitable hydroxy-functional monomers is formed by the reaction products of hydroxylated (meth)acrylates comprising lactone, for example, the reaction product of 2-hydroxyethyl acrylate with ε-caprolactone. The (meth)acrylates of branched 1,3-diols represent a further class of suitable hydroxy-functional ethylenically unsaturated monomers, for example, the (meth)acrylates of 2,2,4-trimethyl-1,3-pentane diol, 2,2-dimethyl propane-1,3-diol, 2-ethyl hexane-1,3-diol, 2-methyl propane-1,3-diol. Further examples of suitable hydroxy-functional unsaturated monomers are hydroxyalkyl esters of additional ethylenically unsaturated acids such as maleic acid, fumaric acid, β-carboxyethyl acrylate, ethacrylic acid, itaconic acid, crotonic acid, citraconic acid, and the like. Specific examples of such hydroxy-functional monomers include 2-hydroxyethyl butyl maleate, bis-(2 hydroxyethyl)maleate, bis-(2-hydroxyethyl)fumarate, ethoxylated β-carboxyethyl acrylate, and propoxylated β-carboxyethyl acrylate.

The polyacrylate polyols can comprise sulphonic acid groups and/or carboxylic acid groups. The total content of acid groups is suitably not higher than 0.9 mmol/gram polyacrylate polyol, for example between 0.09 and 0.6 mmol/gram polyacrylate polyol, or between 0.18 and 0.8 mmol/gram, or between 0.18 and 0.36 mmol/gram. The acid groups can be completely or partially neutralized.

The polyacrylate polyols may comprise sulphonic acid groups and carboxylic acid groups. If both carboxylic and sulphonic acid groups are present, the molar ratio of carboxylic acid groups/sulphonic acid groups suitably has a value between 0.1 and 50, or between 0.5 and 10, or between 1 and 5, or between 1.5 and 3.

Carboxylic or carboxylate groups are conveniently introduced by the copolymerization of ethylenically unsaturated monomers having carboxylic groups. Examples of such carboxylic acid- or carboxylate-functional monomers are (meth) acrylic acid, ethacrylic acid, β-carboxyethyl acrylate, crotonic acid, maleic acid, fumaric acid, itaconic acid, citraconic acid, monoalkyl esters of unsaturated dibasic acids, such as maleic acid, itaconic acid, and citraconic acid.

An alternative method for introducing carboxylic groups into acrylic polymers includes the copolymerization of the reaction products of unsaturated hydroxy-functional monomers, for example, hydroxyalkyl(meth)acrylates as listed above, with a polybasic acid, only a portion of the carboxylic groups being reacted. Examples of such monomers include the monoesters formed by the reaction of 1 mole of a hydroxy-functional monomer with 1 mole of a dibasic acid or its anhydride containing more than 2 carbon atoms. Phthalic acid, maleic acid, succinic acid, hexahydrophthalic acid, tetrahydrophthalic acid, methyl hexahydrophthalic acid, trimellitic acid, dodecenyl succinic acid, and the anhydrides of these acids are examples of polybasic acid reagents. The reaction between the unsaturated hydroxy-functional monomer and polybasic acid can take place beforehand to form the described carboxyl-functional monomer. Alternatively, the reaction can be carried out conveniently during or even after the formation of the acrylic polymer. Also in the latter case, polymers having covalently linked carboxylic groups are obtained.

Sulphonic acid or sulphonate groups can be covalently introduced into a polyacrylate polyol by the copolymerization of ethylenically unsaturated compounds comprising sulphonic acid and/or sulphonate groups. Examples of suitable monomers are monomers represented by the formula:

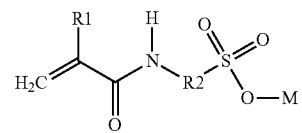

wherein R1 is a hydrogen, a $C_1$ to $C_{20}$ monovalent hydrocarbon radical or a halogen; R2 is a $C_1$ to $C_{20}$ divalent saturated hydrocarbon, optionally branched or substituted, and M is a hydrogen, alkali metal, or ammonium. Suitable sulphonic group-containing monomers are 2-acrylamido-2-methyl propane sulphonic acid, its ammonium salts, for example the salts obtained by neutralization with tertiary amines.

Other examples of suitable sulphonic acid- or sulphonate-functional unsaturated monomers include styrene sulphonic acid, ethylene sulphonic acid, 2-sulfoethyl methacrylate, and their salts. Alternatively, sulphonate groups can be introduced into acrylic polyols by reacting alkali metal salts of taurine or adducts thereof with mono-epoxy compounds, e.g., the glycidyl ester of α-branched monocarboxylic acids, and epoxy-functional monomers, e.g., glycidyl methacrylate, prior to, during or after the formation of the acrylic polyol. Similarly, alkali metal salts of 3-cyclohexylamino-1-propane sulphonic acid can be introduced. Further examples of copolymerizable unsaturated compounds suitable for the covalent introduction of sulphonic acid or sulphonate groups into polyacrylate polyols are the reaction products of free radical-polymerizable monomers comprising an isocyanate group and sulphonic acids or sulphonates comprising at least one isocyanate reactive group. Examples of such free radical-polymerizable monomers are α,α-dimethyl m-isopropenyl benzyl isocyanate and isocyanatoethyl methacrylate. Examples of suitable sulphonic acids or sulphonates comprising at least one isocyanate reactive group are 2-hydroxyethyl sulphonic acid and its salts, alkali metal taurinates, alkali metal N-alkyl taurinates, and the reaction products of mono-epoxy compounds with alkali metal taurinates, 3-cyclohexylamino-1-propane sulphonic acid, and its alkali metal salts.

In one embodiment of the coating composition according to the invention, more than 50% of the sulphonic acid groups and carboxylic acid groups of the polyacrylate polyol are neutralized with a base, which may be volatile. Advantageously, the neutralizing agent is ammonia and/or an amine, such as a tertiary amine. Examples of suitable tertiary amines include trimethyl amine, triethyl amine, triisopropyl amine, triisopropanol amine, N,N-dimethyl ethanol amine, dimethyl isopropyl amine, N,N-diethyl ethanol amine, 1-dimethyl amino-2-propanol, 3-dimethyl amino-1-propanol, 2-dimethyl amino-2-methyl-1-propanol, N-methyl diethanol amine, N-ethyl diethanol amine, N-butyl diethanol amine, N-ethyl morpholine. Suitable primary amines are, for example, isopropyl amine, butyl amine, ethanol amine, 3-amino-1-propanol, 1-amino-2-propanol, 2-amino-2-methyl-1-propanol or 2-amino-2-methyl-1,3-propane diol. Secondary amines that can be used are, for example, morpholine, diethyl amine, dibutyl amine, N-methyl ethanol amine, diethanol amine, and diisopropanol amine. Alternatively, alkali metal hydroxides such as lithium hydroxide, sodium hydroxide, and potassium hydroxide can be used as neutralizing agents. Neutralization can be carried out prior to, during or after polymerization.

In addition to hydroxyl- and acid-functional monomers, at least one ethylenically unsaturated monomer that does not comprise hydroxyl- or acid-functional groups may be used for the preparation of the polyacrylate polyol. Suitable examples of such monomers are esters of acrylic or methacrylic acid having 1 to 18 carbon atoms, or 1 to 12 carbon atoms, in the alcohol part, such as methyl(meth)acrylate, ethyl(meth)acrylate, propyl(meth)acrylate, isopropyl(meth)acrylate, n-butyl(meth)acrylate, isobutyl(meth)acrylate, t-butyl(meth)acrylate, hexyl(meth)acrylate, cyclohexyl(meth)acrylate, n-octyl(meth)acrylate, n-decyl(meth)acrylate, isodecyl(meth)acrylate, lauryl(meth)acrylate, 2-ethylhexyl(meth)acrylate, 3,5,5-trimethyl cyclohexyl(meth)acrylate, t-butyl cyclohexyl(meth)acrylate, isobornyl(meth)acrylate, stearyl(meth)acrylate, (meth)acrylates with ether groups such as 2-methoxy ethyl(meth)acrylate, 2-ethoxy ethyl(meth)acrylate, and 3-methoxy-propyl(meth)acrylate; others such as dimethyl aminoethyl methacrylate, glycidyl (meth)acrylate, 2-acetoacetoxyethyl methacrylate, and 3-(trimethoxysilyl)propyl methacrylate. Further suitable monomers are esters of β-carboxyethyl acrylate and crotonic acid having 1 to 18 carbon atoms in the alcohol part, and (cyclo)alkyl esters of unsaturated dicarboxylic acids with 1 to 12 carbon atoms in the (cyclo)alkyl groups such as diethyl maleate and dibutyl fumarate, di(cyclo)alkyl itaconates, and di(cyclo)alkyl citraconates.

Other ethylenically unsaturated monomers suitable for the preparation of polyacrylate polyols include vinyl aromatic compounds such as styrene, α-methyl styrene, o-, m- or p-methyl styrene, and tert-butyl styrene; acrylamide, methacrylamide, acrylonitrile, N-alkoxy acrylamides, N-alkoxy methacrylamides; vinyl esters of $C_1$-$C_{18}$ monocarboxylic acids such as vinyl acetate, vinyl propionate, vinyl isobutyrate, vinyl esters of α-branched $C_5$-$C_{18}$ monocarboxylic acids, or vinyl esters of α-branched $C_9$-$C_{11}$ acids. Other suitable vinyl monomers include vinyl chloride, vinylidene chloride, vinyl pyrrolidone, and vinyl silanes such as vinyl trimethoxysilane and vinyl triethoxysilane.

The polyacrylate polyols in the composition according to the invention may advantageously comprise hydrophilic alkylene oxide groups. Ethylene oxide groups are suitable, but alternatively propylene oxide groups or mixtures of ethylene oxide and propylene oxide groups are useful as well. For example, acrylic polyols can comprise copolymerized units of esters of unsaturated acids and $C_1$-$C_4$ alkoxy ethers of polyalkylene glycols, such as (meth)acrylates with the structure:

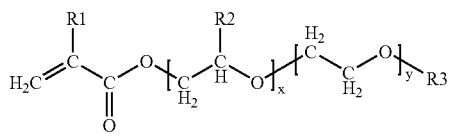

wherein R1 is a hydrogen or methyl group, R2 is an alkyl group with 1 to 4 carbon atoms; R3 is a hydrocarbon radical with 1 to 20, or 1 to 4, or 1 or 2, carbon atoms; x is between 0 and 40, or between 0 and 20, or between 0 and 10; y is between 0 and 50, and x+y is between 2 and 50, or between 2 and 25. Examples of suitable esters of (meth)acrylic acid and polyalkylene glycol monoethers are the (meth)acrylates of the methoxy ethers of polyethylene glycols or polypropylene glycols where the alcohol has a molecular weight between 200 and 2,000, or between 200 and 1,500, or between 350 and 1,000.

The polyacrylate polyols of the invention can also contain minor amounts up to about 10% of polymerized units of polyunsaturated monomers such as allyl methacrylate, ethylene glycol dimethacrylate, hexanediol diacrylate, trimethylol propane triacrylate, and the like.

Suitable initiators for the preparation of the polyacrylate polyols are known in the art, such as di-tert butyl peroxide, tert. butyl peroxy benzoate, tert. butyl peroxy-2-ethyl hexanoate, tert. butyl peroxy-3,5,5-trimethyl hexanoate, and the like, and azo initiators such as 2,2'-azo-bis(2-methylbutyronitrile) and 2,2'-azo-bis(isobutyronitrile).

The molecular weight of the polymers can be controlled by chain regulators such as n-octyl mercaptan, n-dodecyl mercaptan, tert. dodecyl mercaptan, mercapto ethanol, mercapto propionic acid, and thioglycol. The polyacrylate polyols suitably have a weight average molecular weight (Mw) in the range of 2,500 to 150,000. If improved flow properties of the applied coating are required, it may be advantageous to use a polyacrylate polyol having a Mw below 15,000, or below 10,000, or even below 7,000.

Polyurethane Polyols

Suitable polyurethane polyols can be prepared according to generally known methods by reacting an aliphatic, alicyclic or aromatic di- or triisocyanate, one or more polyalcohols containing 2 to 6 hydroxyl groups and having a number average molecular weight up to 600, and/or a polyether or polyester diol having a number average molecular weight between about 400 and about 3,000. In order to achieve hydroxyl functionality in the resulting polyurethane polyols, a stoichiometric excess of the hydroxyl component can be used.

Carboxylic acid groups can be introduced into the polyurethanes by the co-reaction of hydroxy carboxylic acids. Dimethylol propionic acid, hydroxypivalic acid, and hydroxystearic acid are examples of suitable hydroxy carboxylic acids.

Sulphonate groups or sulphonic acid groups can be introduced into a polyurethane polyol, for example, by co-reaction with isocyanates and with hydroxyl- or amine-functional compounds comprising at least one sulphonic acid group or sulphonate group, for example, 2-hydroxyethane sulphonic acid, the sodium salt of 2-aminoethane sulphonic acid, 3-cyclohexylamino-1-propane sulphonic acid, the reaction product of sodium 5-sulphoisophthalate with an equivalent excess of diols, triols or epoxy compounds, in which case the reaction product may contain reacted units of polycarboxylic acids such as adipic acid, phthalic acid, isophthalic acid, hexahydrophthalic anhydride, trimellitic anhydride, etc.

In one embodiment of the coating composition according to the invention, more than 50% of the sulphonic acid groups and carboxylic acid groups of the polyurethane polyol are neutralized with a base. Examples of suitable bases have been mentioned above in the sections describing the polyester polyols and the polyacrylate polyols.

The polyurethane polyols may also comprise non-ionic stabilizing groups in analogy with what has been described for the polyester polyols above. Alternatively or additionally the polyurethane polyols can be stabilized in an aqueous medium by external emulsifiers as mentioned above for polyester polyols.

A polyol, for example an acrylic polyol, can be grafted to the polyurethane polyols. The grafting site in the polyurethane component can be provided by a co-reacted unsaturated monomer, for example, an acryloyl-functional hydroxyl compound such as hydroxyethyl acrylate, hydroxybutyl acrylate, an allyl-functional hydroxyl compound such as trimethylol propane diallyl ether.

The polyurethane polyols can contain organic solvents for reduction of the viscosity. Suitable solvents are aromatic hydrocarbons such as toluene and xylene; alcohols such as ethanol, isopropanol, n-butanol, 2-butanol, hexanol, benzyl alcohol, and ketones such as methylethyl ketone, methylisobutyl ketone, methylamyl ketone, and ethylamyl ketone; esters such as butyl acetate, butyl propionate, ethoxyethyl propionate, ethylglycol acetate, butylglycol acetate, and methoxypropyl acetate; ethers such as 2-methoxypropanol, 2-methoxybutanol, ethylene glycol monobutyl ether, propylene glycol monopropyl ether, propylene glycol monobutyl ether, dioxolane or mixtures thereof. Other suitable solvents are N-methyl-2-pyrrolidone, dimethyl carbonate, propylene carbonate, butyrolactone, caprolactone, etc.

Mixing the, optionally acrylically modified, polyurethane polyol with an aqueous medium can be done conveniently by adding water to the polyol solution or, alternatively, by adding the polyurethane polyol solution to water, under agitation of the water and of the polyol solution. The organic solvent content of the resulting emulsion or dispersion can be reduced by distillation, optionally under reduced pressure.

The Polyisocyanate Crosslinker

Suitable polyisocyanate crosslinkers include 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl) methane, 1,4-diisocyanatobutane, 1,5-diisocyanato-2,2-dimethyl pentane, 1,10-diisocyanatodecane, 1,4-diisocyanato-cyclohexane, 2,4-hexahydrotoluene diisocyanate, 2,6-hexahydrotoluene diisocyanate, norbornane diisocyanate, 1,3-xylene diisocyanate, 1,4-xylene diisocyanate, 1-isocyanato-3-(isocyanato methyl) 1-methylcyclohexane, m-α,α,α',α'-tetramethyl xylene diisocyanate. Also suitable as isocyanate curing agents are triisocyanates, for example, 1,8-diisocyanato-4-(isocyanatomethyl) octane, lysine triisocyanate, and adducts and oligomers of polyisocyanates, for instance, biurets, isocyanurates, allophanates, imino-oxadiazinediones, uretdiones, urethanes, and mixtures thereof. Examples of such oligomers and adducts are the adduct of 3 moles of toluene diisocyanate to 1 mole of trimethylol propane, the isocyanurate trimer of 1,6-diisocyanatohexane, the isocyanurate trimer of isophorone diisocyanate, the uretdion dimer of 1,6-diisocyanatohexane, the biuret trimer of 1,6-diisocyanatohexane, the allophanate-modified trimer or higher oligomers of 1,6-diisocyanatohexane, the adduct of 3 moles of m-α,α,α',α'-tetramethyl xylene diisocyanate to 1 mole of trimethylol propane, and mixtures thereof.

The polyisocyanate crosslinker may comprise hydrophilic groups, for example, covalently bonded hydrophilic polyether moieties. Such polyisocyanates can be stirred in more easily by hand than hydrophobic polyisocyanates.

Suitable polyether compounds for the modification of polyisocyanates are mono- and dihydric polyalkylene oxide polyether alcohols containing a statistical average of 3 to 35 ethylene oxide units. The hydrophilic polyisocyanates generally have an isocyanate functionality of 1.5 to 5 and a content of ethylene oxide units within the bound polyether chains of about 2 to 20% by weight. Examples of hydrophilic polyisocyanates are the reaction products of the isocyanurate trimers of 1,6-diisocyanatohexane and/or the isocyanurate trimers of isophorone diisocyanate and a methyl ether of polyethylene glycol; the reaction product of the adduct of m-α,α,α',α'-tetramethyl xylene diisocyanate (3 moles) to trimethylol propane (1 mole) and a methyl ether of polyethylene glycol.

Alternatively, the polyisocyanate can be rendered hydrophilic by reaction with isocyanate reactive compounds containing ionic groups, for example, the alkali metal salts of sulphonic acids containing at least one hydroxyl group or one isocyanate reactive amine group.

Another class of suitable polyisocyanate crosslinkers are polyisocyanates which contain external emulsifiers to facilitate their dissipation in water borne systems. Such polyisocyanate crosslinkers are commercially available from Rhodia.

The polyisocyanate and the aqueous polyol resin dispersion are suitably mixed in such a ratio that the NCO:OH ratio is in the range of 0.5-3:1, or 0.75-2.5:1, or 1-2:1.

The Thiol-Functional Compound

Esters of mercapto-carboxylic acids are a group of suitable thiol-functional compounds. They can be prepared by reacting hydroxyl group-containing compounds with thiol group-containing acids, such as 3-mercapto propionic acid, 2-mercapto propionic acid, thio-salicylic acid, mercapto succinic acid, mercapto acetic acid, or cysteine. Examples of suitable hydroxyl group-containing compounds are mono-alcohols, diols, triols, and tetraols, such as 2-ethylhexanol, iso-octyl alcohol, decyl alcohol, lauryl alcohol, iso-tridecyl alcohol, or higher monoalcohols or mixtures thereof, 1,4-butane diol, 1,6-hexane diol, 2,2-dimethyl-1,3-propane diol, 2-ethyl-2-propyl-1,3-propane diol, 1,2-, 1,3-, and 1,4-cyclohexane diols, and the corresponding cyclohexane dimethanol, 1,1,1-trimethylol propane, 1,2,3-trimethylol propane, and pentaerythritol. Examples of compounds prepared according to such a method include pentaerythritol tetrakis(3-mercapto propionate), pentaerythritol tetrakis(2-mercapto acetate), trimethylol propane tris(3-mercapto propionate), trimethylol propane tris(2-mercapto propionate), and trimethylol propane tris(2-mercapto acetate). Good results have been obtained with trimethylol propane tris(3-mercapto propionate) and pentaerythritol tetrakis(3-mercapto propionate).

A further example of a compound prepared according to such a method consists of a hyperbranched polyol core based on a starter polyol, e.g., trimethylol propane, and dimethylol propionic acid. This polyol is subsequently esterified with 3-mercapto propionic acid and isononanoic acid. These methods are described in European patent publication EP 0448224 A and International patent publication WO 93/17060.

Other syntheses to prepare thiol-functional compounds involve:
  the reaction of an aryl or alkyl halide with NaHS to introduce a pendant thiol group into the alkyl and aryl compounds, respectively;
  the reaction of a Grignard reagent with sulphur to introduce a pendant thiol group into the structure;
  the reaction of hydrogen sulphide with a polyolefin, a nucleophilic reaction, an electrophilic reaction or a radical reaction;
  the reaction of a (poly)isocyanate with a thiol-functional alcohol, and
  the reduction of disulphides.

The thiol-functional compound can also comprise other functional groups, for example hydroxyl groups. β-Hydroxy-thiols can generally be obtained by reacting epoxide-functional compounds with hydrogen sulphide. An example of such a thiol-functional compound may have the following formula: $T[(C_3H_6O)_n CH_2CHXHCH_2YH]_3$, with T being derived from a triol such as trimethylol propane or glycerol, n being an integer between 0 and 10, X and Y being oxygen or sulphur, with the proviso that X and Y are not equal. An example of such a compound is commercially available from Cognis under the trademark Capcure® 3/800.

Alternatively, polymeric thiol-functional compounds can be used. In this case the polymer is a resin having as a backbone a polyester resin, a polyurethane resin, a polyacrylate resin, or a polyether resin. These polymeric thiol-functional compounds can also comprise hydroxyl groups.

The thiol-functional compound can be a polyester prepared from (a) at least one polycarboxylic acid or reactive derivatives thereof, (b) at least one polyol, and (c) at least one thiol-functional carboxylic acid. The polyesters suitably possess a branched structure. Branched polyesters are conventionally obtained through condensation of polycarboxylic acids or reactive derivatives thereof, such as the corresponding anhydrides or lower alkyl esters, with polyalcohols, when at least one of the reactants has a functionality of at least 3. Examples of suitable polycarboxylic acids or reactive derivatives thereof are tetrahydrophthalic acid, tetrahydrophthalic anhydride, hexahydrophthalic acid, hexahydrophthalic anhydride, methyl hexahydrophthalic acid, methyl hexahydrophthalic anhydride, dimethyl cyclohexane dicarboxylate, 1,4-cyclohexane dicarboxylic acid, 1,3-cyclohexane dicarboxylic acid, phthalic acid, phthalic anhydride, isophthalic acid, terephthalic acid, 5-tert. butyl isophthalic acid, trimellitic anhydride, maleic acid, maleic anhydride, fumaric acid, succinic acid, succinic anhydride, dodecenyl succinic anhydride, dimethyl succinate, glutaric acid, adipic acid, dimethyl adipate, azelaic acid, and mixtures thereof.

Examples of suitable polyols include trimethylol propane, trimethylol ethane, glycerol, 1,2,6-hexanetriol, ethylene glycol, 1,2-propylene glycol, 1,3-propylene glycol, 2-methyl-propane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentane diol, 3-methyl-pentane diol, 1,6-hexane diol, 2,2,4-trimethyl pentane-1,3-diol, dimethylol propionic acid, pentaerythritol, di-trimethylol propane, dipentaerythritol, and mixtures thereof.

Examples of suitable thiol-functional organic acids include 3-mercaptopropionic acid, 2-mercaptopropionic acid, thiosalicylic acid, mercaptosuccinic acid, mercaptoacetic acid, cysteine, and mixtures thereof.

Optionally, monocarboxylic acids and monoalcohols may be used in the preparation of the polyesters. $C_4$-$C_{18}$ monocarboxylic acids and $C_6$-$C_{18}$ monoalcohols may be used. Examples of the $C_4$-$C_{18}$ monocarboxylic acids include pivalic acid, hexanoic acid, heptanoic acid, octanoic acid, nonanoic acid, 2-ethylhexanoic acid, isononanoic acid, decanoic acid, lauric acid, myristic acid, palmitic acid, isostearic acid, stearic acid, hydroxystearic acid, benzoic acid, 4-tert. butyl benzoic acid, and mixtures thereof. Examples of the $C_6$-$C_{18}$ monoalcohols include cyclohexanol, 2-ethylhexanol, stearyl alcohol, and 4-tert. butyl cyclohexanol.

The thiol-functional compound may also comprise ionic and/or non-ionic groups for stabilization of the thiol-functional compound in an aqueous solution or dispersion. Suitable ionic and non-ionic stabilizing groups are those which have been described above for polyol resins.

Good results can also be obtained with an aqueous thiol-functional polyurethane dispersion which is obtainable by first preparing an isocyanate-functional polyurethane from diols, diisocyanates, and building blocks containing groups which facilitate the stabilization of the resin in an aqueous dispersion, followed by reaction of the isocyanate-functional polyurethane with a polyfunctional thiol in a base-catalyzed addition reaction, followed by dispersion in water.

The thiol-functional compound may be a thiol-functional polyacrylate. Such a polyacrylate is derived from hydroxyl-functional acrylic monomers, such as hydroxy ethyl(meth) acrylate, hydroxy propyl(meth)acrylate, hydroxy butyl (meth)acrylate, other acrylic monomers such as (meth) acrylic acid, methyl(meth)acrylate, butyl(meth)acrylate, optionally in combination with a vinyl derivative such as styrene, and the like, or mixtures thereof, the terms (meth) acrylate and (meth)acrylic acid referring to both methacrylate and acrylate, as well as to methacrylic acid and acrylic acid, respectively. The thiol group is introduced by esterification of (part of) the hydroxyl groups of the acrylate copolymer with one or more of the thiol-functional carboxylic acids described above.

Alternatively, glycidyl methacrylate is introduced into the polymer to prepare an epoxy-functional polyacrylate. The epoxy groups are then reacted with suitable thiol-functional carboxylic acids such as mentioned above. Alternatively, the thiol group can be introduced by reacting an isocyanate-functional polyacrylate and a thiol-functional alcohol, e.g., mercapto ethanol. The polyacrylate is prepared by conventional methods, for instance, by the slow addition of appropriate monomers to a solution of an appropriate polymerization initiator, such as an azo or peroxy initiator.

Also included in the coating composition of the invention may be thiol-functional hydrocarbons and thiol-functional alcohols, which can be mono-, di, tri-, or higher thiol-functional compounds such as ethane dithiol, bis-beta-mercaptoethyl sulphide, thiophenol, 2-mercaptoethanol, 1,4-butane dithiol, 2,3-dimercapto propanol, dodecane dithiol, 1,6-hexane dithiol, 1-octane thiol, dodecane thiol, cyclohexyl mercaptan, and the like, and mixtures thereof.

The thiol-functional compound suitably comprises 1 to 6 thiol groups per molecule. Thiol-functional compounds having 1 to 4 thiol groups are preferred. If the coating composition additionally comprises a metal based curing catalyst as described below, the preferred number of thiol groups per molecule of thiol-functional compound is 1 or 2. The advantage of using a mono- or difunctional thiol-functional compound is even more pronounced if a high amount of curing catalyst is present to achieve a high cure speed of the coating composition.

Examples of suitable thiol-functional compounds are pentaerythritol tetrakis(3-mercapto propionate), trimethylol propane tris(3-mercapto propionate), Capcure® 3/800, 1-dodecane thiol, and dodecyl-3-mercapto propionate.

The thiol-functional compound is generally present in an amount of 0.05 to 25 weight-%, or in an amount of 0.5 to 20 weight-%, calculated on the weight of solid polyol resin.

As mentioned above, the molar ratio of isocyanate groups to thiol groups in the coating composition according to the invention ranges between 1:0.0001 and 1:0.4. Alternatively, the molar ratio of isocyanate groups to thiol groups ranges between 1:0.0003 and 1:0.25. A preferred range is between 1:0.0006 and 1:0.20.

The coating composition of the invention is generally employed as a multicomponent composition. This means that the polyol and the polyisocyanate crosslinker are generally stored in separate containers. The components are mixed prior to application.

The polyol can be dispersed in water during or after preparation of the polyol as outlined above. In a particular embodiment of the invention, it is also possible to store and deliver the polyol in a substantially non-aqueous form and to disperse the polyol immediately prior to formation of the coating composition. In yet another embodiment, it is possible to disperse the polyol in water after it has been mixed with at least one or all of the other components of the coating composition. Details of these embodiments are generally known and can for example be inferred from International patent application WO 00/59977.

It is to be understood that polyols with different types of polymeric or oligomeric backbones as described above can be used as such or as mixtures or hybrids.

Due to possible hydrolysis of isocyanate groups, the polyisocyanate crosslinker is generally stored under non-aqueous conditions before formation of the aqueous coating composition.

The thiol-functional compound can be added to the coating composition as a separate component, but it can also be pre-mixed with the polyol or other separate components, e.g. with a diluent or with an optionally present curing catalyst. If a metal based catalyst is present in the coating composition, it is possible to pre-mix the thiol-functional compound with the metal based curing catalyst and to subsequently add the pre-mix to the polyol. The pre-mix of catalyst and thiol-functional compound can be added to the polyol before or after formation of an aqueous polyol dispersion. This gives rise to a particularly favourable exploitation of the effect of the current invention, i.e. an improved balance of curing rate, appearance, and pot life.

The pre-mix of catalyst and thiol-functional compound may be provided as a mixture of the compounds as such, as a solution in a suitable organic solvent, or in an aqueous carrier, i.e. as an aqueous solution or dispersion. If provided in an aqueous carrier, the thiol-functional compound suitably comprises ionic or non-ionic stabilizing groups as described above.

Although we do not wish to be bound by any theory, it is believed that an interaction between the thiol-functional compound and the metal based catalyst leads to temporary partial deactivation of the catalyst.

It is also possible that the polyol comprises thiol-functional groups. In this case the thiol-functional compound does not form a separate component.

Optional Components

In one embodiment the coating composition of the invention also comprises a metal based curing catalyst. Suitable metals include zinc, cobalt, manganese, zirconium, bismuth, and tin. It is preferred that the coating composition comprises a tin based catalyst. Well-known examples of tin based catalysts are dimethyl tin dilaurate, dimethyl tin diversatate, dimethyl tin dioleate, dibutyl tin dilaurate, dioctyl tin dilaurate, and tin octoate.

When the coating composition according to the invention comprises a metal based catalyst, it is preferred that the molar ratio of catalyst metal atoms to thiol-functional groups ranges between 1:0.5 and 1:250, or between 1:0.8 and 1:150, or between 1:1 and 1:100.

The coating composition according to the invention can further comprise other components and additives conventionally present in coating compositions, such as pigments, extenders, colouring agents, pigment dispersants, emulsifiers (surfactants), rheology-controlling agents, levelling agents, flatting agents, coalescents, wetting agents, anti-cratering agents, anti-foaming agents, biocides, plasticizers, UV absorbers, light stabilizers, and odour masking agents.

Also included in the coating composition of the invention may be reactive diluents such as water-soluble mono- or (preferably) polyhydric alcohols. Examples of monohydric alcohols include hexyl glycol, butoxyethanol, 1-methoxy-2-propanol, 1-ethoxy-2-propanol, 1-propoxy-2-propanol, 1-butoxy-2-propanol, 2-methoxybutanol, 1-isobutoxy-2-propanol, dipropylene glycol monomethyl ether, diacetone alcohol, methanol, ethanol, propanol, isopropanol, butanol, 2-butanol, pentanol, hexanol, benzyl alcohol, and mixtures thereof. Examples of polyhydric alcohols include ethylene glycol, diethylene glycol, propylene glycol, isomeric butane diols, the polyethylene oxide glycols or polypropylene oxide glycols, 1,1,1-trimethylol propane, 1,2,3-trimethylol propane, pentaerythritol, glycerol, and mixtures thereof.

The invention also relates to a kit of parts for preparation of a water borne coating composition comprising
a) a binder module comprising a polyol,
b) a crosslinker module comprising a polyisocyanate, and
c) an additive module comprising a thiol-functional compound.

The crosslinker module b) or the additive module c) or both may additionally comprise a metal based curing catalyst.

In an alternative embodiment the kit of parts comprises
a) a binder module comprising a polyol and a thiol-functional compound and
b) a crosslinker module comprising a polyisocyanate.

In a preferred version of this alternative the binder module additionally comprises a metal based curing catalyst, or the kit of parts additionally comprises an additive module c) comprising a metal based curing catalyst.

The kit of parts suitably comprises metering aids to facilitate mixing of the components in the required ratios. In one embodiment, the modules of the kit of parts comprise the components in the required ratios, i.e. the modules are provided in a plurality of containers which contain the components in the required amounts to form the coating composition of the invention. Alternatively, the amount of the components may be provided in ratios deviating from the required ratios for the coating composition and additionally a metering aid is provided, such a mixing container having visible indications for the required volumes of the modules to form the coating composition of the invention. The required volumes may also be indicated on a so-called metering stick which is common in the paint industry. Variations and combinations of suitable metering aids will be readily appreciated by a skilled person.

The coating composition of the invention can further comprise one or more other well-known coating resins, for example, epoxy resins, phenolic resins, cellulose nitrate, polyvinyl butyral resins, etc. If so desired, the other coating resins can be functionalized with hydroxyl reactive groups selected from the group of isocyanate, epoxy, acetal, carboxyl, anhydride, and alkoxy silane groups. Also, mixtures of these groups in one compound are included. The coating composition can also comprise an amino resin. Depending on the presence of additional functional groups, the coating composition can further comprise other known curing catalysts, for example, tertiary amines or sulphonic acids, such as p-toluene sulphonic acid and dodecyl benzene sulphonic acid.

The major part of the volatile content of the coating composition of the present invention consists of water. However, the coating composition can contain one or more organic solvents, with the proviso that the volatile organic content (VOC) of the ready-for-use coating composition does not exceed 540 g/l, preferably it does not exceed 420 g/l. As suitable organic solvents may be mentioned dimethyl dipropylene glycol, methyl ether of diacetone alcohol, ethyl acetate, butyl acetate, ethyl glycol acetate, butyl glycol acetate, 1-methoxy-2-propyl acetate, butyl propionate, ethoxy ethyl propionate, toluene, xylene, methylethyl ketone, methyl isobutyl ketone, methyl isoamyl ketone, ethyl amyl ketone, dioxolane, N-methyl-2-pyrrolidone, dimethyl carbonate, propylene carbonate, butyrolactone, caprolactone, and mixtures thereof.

The coating composition is particularly suitable as clear and/or pigmented top coat. The composition according to the invention is also suitable for use as filler, primer, base coat, and adhesive.

The coating composition can be applied to many substrates, such as metal, wood, paper, cardboard, gypsum, concrete, glass, plastic and other synthetic materials, including some other coating layer. The other coating layer may be comprised of the coating composition of the current invention or it may be comprised of a different coating composition. The coating composition shows particular utility as a clear coat in a multi-layer lacquer coating, such as a clear top coat on a colour and/or effect imparting base coat.

The coating composition of the current invention can be used advantageously in various application fields, such as the finishing and refinishing of automobiles and large transportation vehicles such as trucks, buses, railway equipment, airplanes and ships, and further on steel and concrete constructions.

Any known methods for applying coating compositions to a substrate can be used. Non-limiting examples of such application methods are spreading (e.g., brushing, rolling, by paint pad or doctor blade), spraying (e.g., airfed spraying, airless spraying, hot spraying, spraying with a two-component spray gun, and electrostatic spraying), flow coating (e.g., dipping, curtain coating, roller coating and reverse roller coating), and electrodeposition.

Coating layers prepared from the composition of the current invention can be dried and cured between 0 and 160° C., or between 5 and 80° C., or between 10 and 60° C. Curing at elevated temperature can be carried out in an oven. Alternatively, curing may be supported by infrared and/or near radiation. Before curing at elevated temperature the applied coating composition may optionally be subjected to a flash-off phase.

The invention is further described and illustrated by the following examples.

Materials Used:

| | |
|---|---|
| BYK 346: | a wetting agent available from BYK-Chemie GmbH, Wesel, Germany |
| DBTDL in 2-butanol: | a solution of 2 weight-% of dibutyltin dilaurate in 2-butanol |
| DBTDL in Proglyde DMM: | a solution of 4 weight-% of dibutyl tin dilaurate in dipropyleneglycol dimethylether |
| PTMP: | pentaerythritol tetrakis(3-mercapto propionate) |
| Desmodur N 3600: | a polyisocyanate crosslinker based on the isocyanurate of 1,6-diisocyanatohexane, available from Bayer |
| Desmodur N 3400: | a polyisocyanate crosslinker based on the uretdion of 1,6-diisocyanatohexane, available from Bayer |
| Bayhydur N 3100: | a hydrophilic modified polyisocyanate crosslinker based on the isocyanurate of 1,6-diisocyanatohexane, available from Bayer |
| Bayhydur LS 2150: | a hydrophilic modified polyisocyanate crosslinker based on the isocyanurate of isophorone diisocyanate, available from Bayer |
| EB acetate: | butylglycol acetate |
| EEP | 2-ethoxyethyl propionate |
| Dowanol PMA: | methoxypropyl acetate from Dow |
| Autowave ® | a water borne base coat composition from Akzo Nobel Car Refinishes |

General Methods

The average particle size given was determined with the aid of dynamic light scattering, with the dispersion diluted to a solids content of about 0.1 wt. %. The viscosity was determined with a Brookfield viscometer (LV-4; 60 revolutions per minute). The solids content was calculated from the weight loss of a sample heated to 140° C. over a period of 30 minutes. The Mn was measured with GPC with polystyrene as standard.

Infrared spectra were measured on a Biorad FTS-60 spectrophotometer or on a Bruker Vector 22 instrument. Infrared spectra were measured making use of a Golden Gate single reflection ATR device. All infrared spectra were recorded between 4,000 cm$^{-1}$ and 600 cm$^{-1}$ at a resolution of 2 cm$^{-1}$.

The drying stage of applied coating layers was determined manually, with 10 drying stages being discerned:

| | |
|---|---|
| 1 | The still-wet coating is easily rubbed off with the thumb. |
| 2 | By touching the coating with the thumb, threads of paint may be drawn. |
| 3 | The coating is cohesive, but is easily damaged down to the substrate by gentle rubbing with the thumb. |
| 4 | Gentle rubbing with the thumb leaves a clear mark. |

-continued

5. Gentle rubbing with the thumb hardly leaves a mark. A tuft of wadding, dropped on the paint, can be blown off. The coating is dust-dry.
6. Gentle rubbing with the thumb leaves no mark. On gentle rubbing or pushing with the palm of the hand a sticky effect is felt.
7. On gentle rubbing or pushing with the palm of the hand, no stickiness is observed. The coating is tack-free.
8. Firm pushing with the thumb leaves a permanent mark.
9. The mark from firm pushing with the thumb disappears after 1-2 minutes. The coating is touch-dry.
10. The coating can hardly, or not at all, be damaged by scratching with the (human) nail. The coating is hardened-through.

The distinctness of image (DOI) of clear coat films was determined with an ATI DOI-meter one day after application of the clear coat. Higher DOI values indicate a better film appearance.

Preparation of a Polyester Polyol 1

A 6-liter 4-neck flask was fitted with a variable speed stirrer, thermocouples in combination with a controller, a distillation column, a condenser, a nitrogen in- and outlet, and a heating mantle. The flask was charged with a mixture composed of:

| | |
|---|---|
| 385.1 g | of isophthalic acid |
| 42.9 g | of 5-(sodium sulpho) isophthalic acid |
| 852.5 g | of 1,4-cyclohexanedimethanol |
| 1,265.0 g | of trimethylol propane |
| 50.0 g | of demineralized water |
| 0.5 g | of Fascat 4100 |

After deaeration, the flask was brought under a nitrogen atmosphere. The contents of the flask were heated to 150° C., whereupon the temperature was gradually increased to 200° C. over a period of 2 hours. Water was distilled off. The temperature of 200° C. was maintained in the flask until a clear reaction melt was obtained. The mixture was cooled to 140° C., after which the following components were added:

| | |
|---|---|
| 385.1 g | isophthalic acid and |
| 1,195.8 g | sebacic acid |

After the temperature of the reaction mixture had been gradually increased to 195° C., the mixture was kept at this temperature and water was distilled off until a clear reaction melt was obtained. After the reaction mixture had been cooled to 140° C., the following components were added:

| | |
|---|---|
| 345.3 g | of isophthalic acid and |
| 111.0 g | of methoxy polyethylene oxide glycol (Mn = 750) |

The reaction mixture was gradually heated to 215° C. and kept at this temperature until an acid value below 7 mg KOH/g was obtained.

The end product had an acid number of 6.4 mg KOH/g, a practical OH-value of 199 mg KOH/g, an OH-functionality of 4.9, and an Mn=1771.

Preparation of a Polyester Dispersion 1 from Polyester Polyol 1 Described Above

A 2 l flask fitted with a stirrer, a thermometer, a reflux condenser, and a dropping funnel was filled with 500 g of polyester polyol 1.

The contents of the flask were heated to 110° C., at which temperature there were added:

1.5 g of N,N-dimethylethanolamine (corresponding to a neutralization degree of the carboxylic acid groups of 30%) and subsequently, over a period of 3 hours: 425.9 g of demineralized water, after which the temperature was gradually decreased from 100° C. to 30° C.

The properties of the thus obtained water borne polyester dispersion were pH 7.0, particle size 126 nm, viscosity 0.78 Pa sec, non-volatile content 54 weight-%.

Preparation of Polyester Polyol 2

A 3-liter 4-neck flask was fitted with a variable speed stirrer, thermocouples in combination with a controller, a distillation column, a condenser, a nitrogen in- and outlet, and a heating mantle. The flask was charged with a mixture composed of:

| | |
|---|---|
| 275.42 g | of hexahydrophthalic acid anhydride |
| 28.20 g | of 5-(sodium sulpho) isophthalic acid |
| 473.98 g | of 1,4-cyclohexanedimethanol |
| 661.17 g | of trimethylol propane |
| 58.75 g | of demineralized water |
| 1.25 g | of Fascat 4100 |

After deaeration, the flask was brought under a nitrogen atmosphere. The contents of the flask were heated to 150° C., whereupon the temperature was gradually increased to 200° C. over a period of 1.5 hours. Water was distilled off. The temperature of 200° C. was maintained in the flask until a clear reaction melt was obtained. The mixture was cooled to 140° C., after which the following components were added:

| | |
|---|---|
| 550.85 g | of hexahydrophthalic acid anhydride |
| 319.08 g | of sebacinic acid |
| 187.19 g | of methoxy polyethylene oxide glycol (Mn = 750) |

The temperature of the reaction mixture was gradually increased to 220° C., and it was kept at this temperature until an acid value of about 10 mg KOH/g was obtained.

The end product had an acid number of 9.1 mg KOH/g, a practical OH-value of 190 mg KOH/g, an OH-functionality of 4.3, and an Mn=2295.

Preparation of a Polyester Dispersion 2 from Polyester Polyol 2 Described Above

A flask fitted with a stirrer, a thermometer, a reflux condenser, and a dropping funnel was filled with 431.3 g of polyester polyol 2.

The contents of the flask were heated to 90° C., at which temperature there were added:

5.0 g of N,N-dimethylethanolamine (corresponding to a neutralization degree of the carboxylic acid groups of 80%) and subsequently, over a period of 3 hours: 590.6 g of demineralized water, after which the temperature was gradually decreased from 90° C. to 30° C.

The properties of the thus obtained water borne polyester dispersion were pH 8.4, particle size 78 nm, viscosity 0.12 Pa sec, non-volatile content 42 weight-%.

Preparation of Polyacrylate Polyol 1

A reaction vessel equipped with an agitator, a condenser, a thermocouple, and a nitrogen inlet device was charged with 218 g butylglycol and heated to 140° C. under a nitrogen flow of 5 l per hour. Then a mixture of 162 g n-butyl acrylate, 142 g styrene, 152 g methyl methacrylate, 208 g hydroxyethyl acrylate, 21 g lauryl methacrylate, and 22 g Trigonoxe 42S was added continuously to the reactor. During the addition the temperature of the reactor content was maintained at 140° C. After a dosing time of 165 minutes, when about 75 weight-% of the monomer and the initiator had been added, the addition was stopped. In this first phase, a hydrophobic acrylic polymer without acid-functional groups was formed.

A preformed mixture of 11 g 2-acrylamido 2-methyl propane sulphonic acid, 5 g 2-(dimethyl amino) ethanol, and 18 g butylglycol was mixed with 13 g of acrylic acid. This mixture was then added to the remaining portion of the monomer and initiator mixture. The resulting mixture was homogenized. Subsequently, the mixture was fed to the reactor over a period of 75 minutes, the temperature in the reactor being held at 140° C. In this second phase acid-functional polymers are formed.

After completion of the monomer addition, the dosing equipment was rinsed with 21 g butylglycol, which was subsequently added to the reactor content. The reactor charge was held at 140° C. for 15 minutes. A solution of 1 g Trigonox® 42 S in 6 g butylglycol was then added in two equal portions with a time interval of 15 minutes. After the mixture was held at 140° C. for another 30 minutes, the reactor content was cooled to room temperature.

The polyacrylate polyol had a hydroxyl number of 140 mg KOH/g on solids, a weight average molecular weight of 16,800 and a number average molecular weight of 5,200. The combined carboxylic acid/carboxylate content was 0.225 mmol/g on solids, the combined sulphonic acid/sulphonate content was 0.075 mmol/g on solids. The solids content of the solution was 72.1% by weight.

Preparation of Polyacrylate Polyol Dispersion 1

Into a glass reactor equipped with a stirrer, a nitrogen inlet, and a condenser 440 g of polyacrylate polyol solution 1 described above were charged and heated to 130° C. under a nitrogen flow of 10 l per hour. Then, under reduced pressure, about 25 weight-% of butylglycol was distilled off in order to obtain a concentrated resin solution. The content of the reactor was added gradually, over a period of 20 minutes, to a second reactor containing 548 g demineralized water and 12 g dimethanol amine pre-heated to 50-55° C. During the addition of the concentrated resin solution the temperature in the second reactor increased to about 60° C. A white aqueous emulsion was obtained, which was stirred at 55-60° C. for a period of 60 minutes. Finally the emulsion was cooled to room temperature and filtered. The polyacrylate dispersion had a solids content of 39.4 weight-%, an average particle size of 98 nm, and a viscosity of 100 mPa·s at 23° C.

Coating compositions A and 1-4 were prepared from the ingredients as shown in Table 1; the amount of ingredients is given in parts by weight:

TABLE 1

|  | A | 1 | 2 | 3 | 4 |
| --- | --- | --- | --- | --- | --- |
| Component A |  |  |  |  |  |
| Polyester polyol dispersion 1 | 10.00 | 10.00 | 10.00 | 10.00 | 10.00 |
| BYK 346 | 0.16 | 0.16 | 0.16 | 0.16 | 0.16 |
| DBTDL in 2-butanol | 0.21 | 0.21 | 0.21 | 0.21 | 0.21 |
| PTMP | 0.00 | 0.10 | 0.25 | 0.50 | 1.00 |
| Component B |  |  |  |  |  |
| Desmodur N 3600 | 4.28 | 4.28 | 4.28 | 4.28 | 4.28 |
| Dowanol PMA | 2.96 | 2.96 | 2.96 | 2.96 | 2.96 |
| Component C |  |  |  |  |  |
| Water | 1.79 | 1.79 | 1.79 | 1.79 | 1.79 |
| Molar ratio NCO:SH | 1:0 | 1:0.035 | 1:0.085 | 1:0.171 | 1:0.34 |

The coating compositions according to Table 1 were prepared as follows: Component A was stirred with an electrical stirrer at 600 rotations per minute, component B was added, stirring was continued for 2 minutes and component C was added. The final composition was stirred for another 2 minutes. Composition A is a comparative composition which represents the state of the art water borne coating composition comprising a polyol and a polyisocyanate crosslinker according to WO 01/81441. Compositions 1-4 represent coating compositions according to the invention.

Curing Speed of Coating Compositions A and 1-4:

The curing of compositions A and 1-4 was followed by observation of the isocyanate signal at 2,275 $cm^{-1}$ in their infrared spectra. For measurement of the infrared spectra a 60 μm film of the coating composition was applied to the golden gate crystal 15 minutes after preparation of the composition. The films were touch-dry within 10 minutes. Spectra were measured at room temperature every 7 minutes. In FIG. 1 the height of the isocyanate signal is plotted versus time. It should be noted that the increase in isocyanate signal height in the first phase of curing can be explained by an increase in isocyanate concentration due to evaporation of solvent and water.

FIG. 1 shows that the decrease in isocyanate content during curing of coating compositions 3 and 4 is faster than in the case of composition A, the isocyanate decrease of composition 2 is practically equal to that of composition A, while the isocyanate decrease of composition 1 is slightly slower than that of composition A.

Since the decrease in isocyanate content indicates the curing rate of water borne coating compositions comprising a polyol and a polyisocyanate crosslinker, it can be concluded that the curing rate of coating compositions 2-4 according to the invention is the same or higher than the curing rate of comparative coating composition A comprising no thiol-functional compound.

Figure 2:
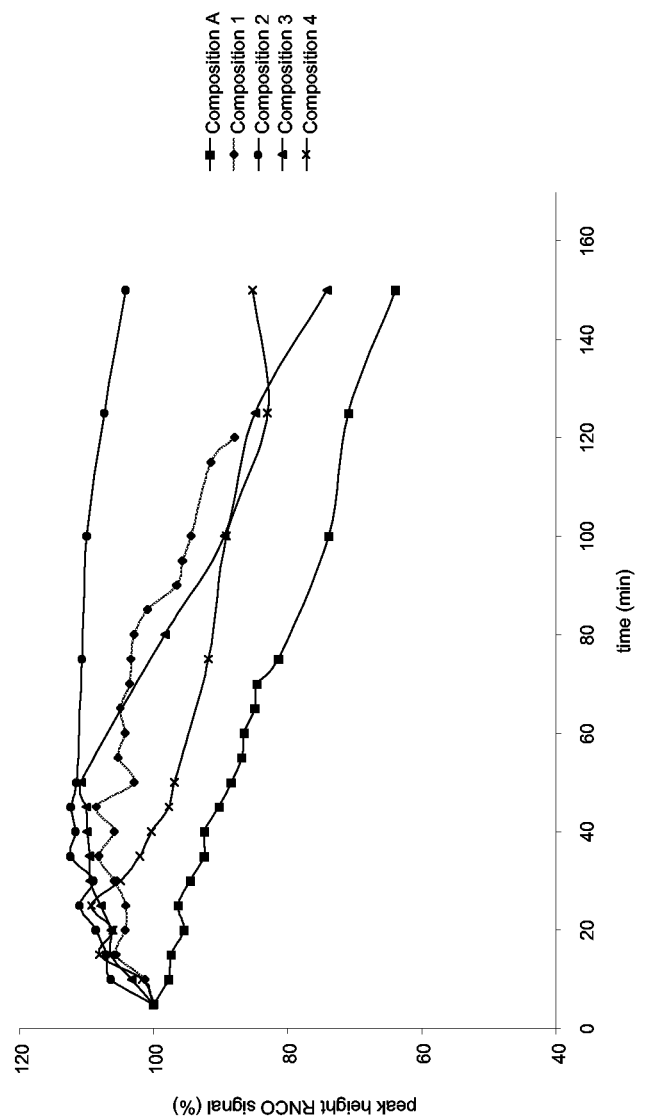
FIG. 2 is a graphic representation of the results of the pot life experiment with coating compositions A and 1-4.

Pot Life of Coating Compositions A and 1-4:

The decrease of the isocyanate content of the compositions A and 1-4 after mixing, i.e. during their pot life, was determined by observation of the isocyanate signal at 2,275 $cm^{-1}$ in their infrared spectra. For measurement of the infrared spectra a few drops of the composition were placed on the diamond crystal of the IR spectrometer directly after mixing and immediately capped with a rubber-ring sealed metal cap. Spectra were measured every 5 minutes until a maximum time of 150 minutes. In FIG. 2 the height of the isocyanate signal is plotted versus time. The height of the isocyanate signal of the first measurement of every composition was set to a relative value of 100 in FIG. 2.

FIG. 2 clearly shows that the decrease of the isocyanate content after mixing of the coating compositions 1-4 is slower than in comparative coating composition A. Since the decrease in isocyanate content determines the pot life of water borne coating compositions comprising a polyol and a polyisocyanate crosslinker, the pot life of coating compositions 1-4 according to the invention is longer than the pot life of composition A comprising no thiol-functional compound.

Figure 3:
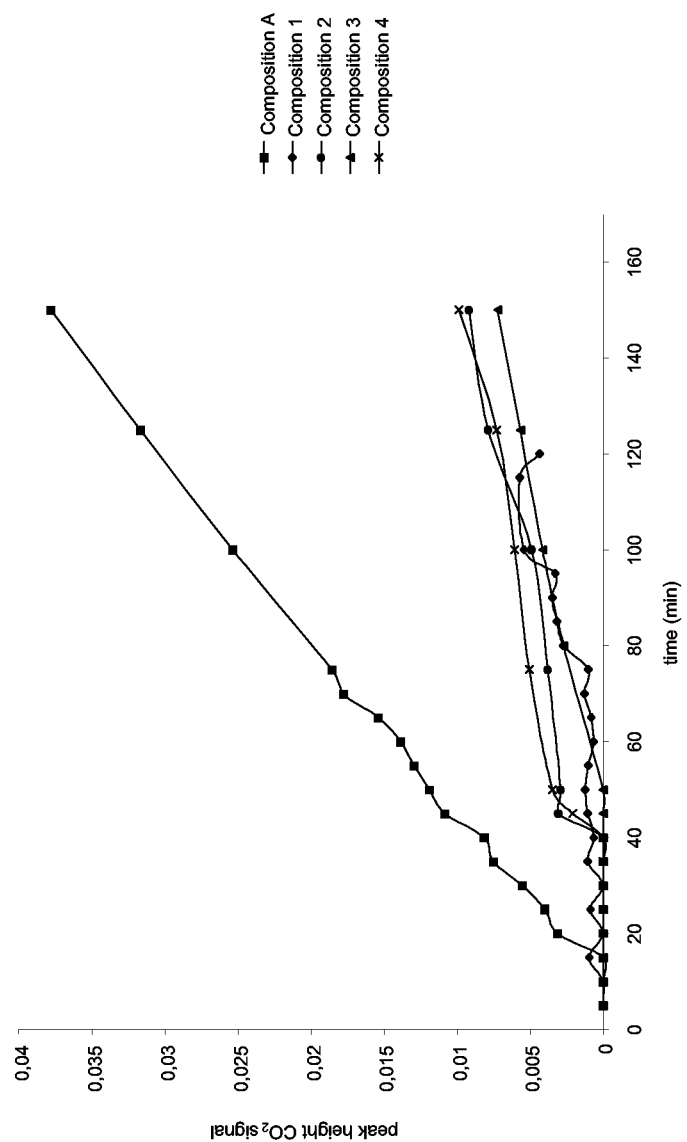
FIG. 3 is a graphic representation of the carbon dioxide formation experiment with coating compositions A and 1-4.

Carbon Dioxide Formation of Coating Compositions A and 1-4:

The increase in carbon dioxide content of compositions A and 1-4 after mixing, i.e. during their pot life, was determined by observation of the carbon dioxide signal at 2,334 $cm^{-1}$ in their infrared spectra. The measurement of the infrared spectra was carried out as described above for determination of the isocyanate decrease during pot life. In FIG. 3 the height of the carbon dioxide signal is plotted versus time.

FIG. 3 clearly shows that the amount of carbon dioxide formed in composition A is higher than in compositions 1-4. Formation of carbon dioxide is one of the major causes of film defects and poor appearance of water borne coating compositions comprising a polyol and a polyisocyanate crosslinker. Therefore, it can be concluded that coating compositions 1-4 according to the invention have a higher potential for good appearance than composition A comprising no thiol-functional compound.

Coating Compositions B and 5 to 8

Comparative coating composition B and compositions 5 to 8 according to the invention were prepared from the ingredients as shown in Table 2; the amount of ingredients is given in parts by weight.

The coating compositions according to Table 2 were prepared as follows: Component A was stirred with an electrical stirrer at 600 rotations per minute, component B was added, stirring was continued for 2 minutes and component C was added. The final composition was stirred for another 2 minutes.

TABLE 2

|  | B | 5 | 6 | 7 | 8 |
| --- | --- | --- | --- | --- | --- |
| Component A |  |  |  |  |  |
| Polyester polyol dispersion 2 | 75 | 75 | 75 | 75 | 75 |
| water | 10 | 10 | 10 | 10 | 10 |
| Byk 346 | 1 | 1 | 1 | 1 | 1 |
| PTMP | 0 | 0.75 | 1.5 | 3 | 0 |
| 1-mercapto dodecane | 0 | 0 | 0 | 0 | 2.5 |
| Component B |  |  |  |  |  |
| Desmodur N 3400 | 8.45 | 8.45 | 8.45 | 8.45 | 8.45 |
| Bayhydur N 3100 | 10.85 | 10.85 | 10.85 | 10.85 | 10.85 |
| Bayhydur LS 2150 | 19.88 | 19.88 | 19.88 | 19.88 | 19.88 |
| Dowanol PMA | 3.5 | 3.5 | 3.5 | 3.5 | 3.5 |
| EB acetate | 10.5 | 10.5 | 10.5 | 10.5 | 10.5 |
| Component C |  |  |  |  |  |
| Water | 32 | 32 | 32 | 32 | 32 |
| Molar ratio NCO:SH | 1:0 | 1:0.046 | 1:0.092 | 1:0.184 | 1:0.093 |

Precoated aluminium panels were coated with a layer of Autowave®, a water borne base coat which was applied and dried as prescribed in the technical documentation of the supplier.

In a first series the clear coat compositions of Table 2 were spray applied directly after preparation on top of the base coat panels. The dry layer thickness of the clear coats was in the range of 40 to 50 µm. After application of the clear coats the panels were subjected to a flash-off period of ten minutes at room temperature. Subsequently the panels were cured for 45 minutes in an oven at 60° C. After cooling to room temperature the drying stage of the clear coats was determined manually. The DOI was determined after one day.

In a second series the clear coat compositions of Table 2 were applied in a similar manner as in the first series; however, the clear coat compositions were allowed to stand for 60 minutes before application and oven cured for 30 minutes at 60° C. The results are summarized in Table 3.

TABLE 3

| applied directly after mixing | drying stage after 45 min./ 60° C. | DOI | applied 60 minutes after mixing | drying stage 30 min./ 60° C. | DOI |
| --- | --- | --- | --- | --- | --- |
| B | 6-7 | 85 | B | 4 | 85 |
| 5 | 9 | 86 | 4 | 6 | 85 |
| 6 | 8-9 | 84 | 5 | 6 | 85 |
| 7 | 9-10 | 81 | 6 | 8-9 | 83 |
| 8 | 6-7 | 87 | 7 | 6-7 | 85 |

From Table 3 it can be inferred that the clear coat compositions according to the invention exhibit an improved curing rate over comparative clear coat composition B. The appearance of the clear coats of the invention is on a similar level and can in some cases be superior to the appearance of the comparative clear coat. The improved curing rate is also apparent when the clear coats are applied one hour after mixing, which indicates that the advantages are not obtained at the expense of pot life. The compositions of Table 2 do not comprise a curing catalyst for the isocyanate-hydroxyl addition reaction, such as dibutyltin dilaurate. The beneficial effect of the current invention is also observed in the absence of such a curing catalyst.

Coating Compositions C, D, and 9

Comparative coating compositions C and D and coating composition 9 according to the invention were prepared from the ingredients as shown in Table 4; the amount of ingredients is given in parts by weight. The coating compositions were prepared as described above for compositions 5 to 8. DBTDL in Proglyde DMM and the thiol functional compound were pre-mixed before addition to component A.

TABLE 4

|  | C | D | 9 |
| --- | --- | --- | --- |
| Component A |  |  |  |
| Polyester polyol dispersion 2 | 110 | 110 | 110 |
| Byk 346 | 1.46 | 1.46 | 1.46 |
| DBTDL in Proglyde DMM | 0.89 | 3.56 | 3.56 |
| PTMP | 0 | 0 | 0 |
| 1-mercapto dodecane | 0 | 0 | 1.82 |
| Component B |  |  |  |
| Desmodur N 3400 | 12.20 | 12.20 | 12.20 |
| Bayhydur N 3100 | 15.60 | 15.60 | 15.60 |
| Bayhydur LS 2150 | 28.60 | 28.60 | 28.60 |
| Dowanol PMA | 15 | 15 | 15 |
| EB acetate | 5 | 5 | 5 |
| Component C |  |  |  |
| Water | 57.7 | 55 | 52.4 |
| Molar ratio NCO:SH | 1:0 | 1:0 | 1:0.047 |

Clear coat compositions C, D, and 9 were spray applied on a base coat immediately after preparation as described above for compositions 5 to 8. The clear coats were allowed to cure at room temperature. Table 5 summarizes the results obtained:

TABLE 5

|  | drying stage after 4 h | drying stage after 5 h | drying stage after 6 h | DOI | DOI (1 h) |
| --- | --- | --- | --- | --- | --- |
| C | 4 | 6-7 | 7 | 86 | 84 |
| D | 9 | 10 | 10 | 84 | 65 |
| 9 | 8 | 9 | 9-10 | 87 | 81 |

From Table 5 it can be inferred that the drying speed can increased by increasing the amount of curing catalyst in the composition (comparative examples C and D), even without severe deterioration of the appearance. However, in a further test comparative composition D and composition 9 were applied again one hour after mixing the components and cured at 60° C. for 20 minutes. After one hour of pot life comparative composition D leads to a clear coat having a lower DOI value, i.e. inferior appearance than the clear coat prepared from composition 9 according to the invention. Thus, the improvement of cure speed of comparative composition D is achieved at the expense of pot life, whereas composition 9 offers a good balance of pot life, cure speed, and appearance. It is particularly noteworthy that coating composition 9 according to the invention still has a good pot life, although it comprises amine (present in polyester polyol dispersion 2), a tin catalyst, a polyisocyanate, and a polyester polyol, and a thiol functional compound. From the teaching of U.S. Pat. No. 4,788,083, discussed above, one would expect that such a composition has a short potlife due to deblocking of the tin catalyst by amine.

Coating Compositions E to G and 10 to 14

Comparative coating compositions E to G and coating compositions 10 to 14 according to the invention were prepared from the ingredients as shown in Table 6; the amount of ingredients is given in parts by weight. The coating compositions were prepared as described above for composition 9. It should be noted that in this case a 2 weight-% solution of DBTDL in Proglyde DMM was used.

TABLE 6

|  | E | F | 10 | G | 11 | 12 | 13 | 14 |
|---|---|---|---|---|---|---|---|---|
| Component A |  |  |  |  |  |  |  |  |
| Polyacrylate polyol dispersion 1 | 75 | 75 | 75 | 75 | 75 | 75 | 75 | 75 |
| Byk 346 | 1 | 1 | 1 | 1 | 1 | 1 | 1 | 1 |
| 2 weight-% solution of DBTDL in Proglyde DMM | 1.25 | 2.5 | 2.5 | 5 | 5 | 5 | 5 | 5 |
| PTMP | 0 | 0 | 0.4 | 0 | 0.77 | 0 | 0 | 0 |
| 1-dodecane-thiol | 0 | 0 | 0 | 0 | 0 | 0.64 | 1.28 | 0.13 |
| Component B |  |  |  |  |  |  |  |  |
| Desmodur N 3400 | 4.37 | 4.37 | 4.37 | 4.37 | 4.37 | 4.37 | 4.37 | 4.37 |
| Bayhydur N 3100 | 5.17 | 5.17 | 5.17 | 5.17 | 5.17 | 5.17 | 5.17 | 5.17 |
| Bayhydur LS 2150 | 20.6 | 20.6 | 20.6 | 20.6 | 20.6 | 20.6 | 20.6 | 20.6 |
| EEP | 19.6 | 19.6 | 19.6 | 19.6 | 19.6 | 19.6 | 19.6 | 19.6 |
| EB acetate | 5.1 | 5.1 | 5.1 | 5.1 | 5.1 | 5.1 | 5.1 | 5.1 |
| Component C |  |  |  |  |  |  |  |  |
| water | 24.6 | 24.6 | 24.6 | 24.6 | 24.6 | 24.6 | 24.6 | 24.6 |
| Moles SH per 1 mol of NCO | 0 | 0 | 0.036 | 0 | 0.070 | 0.035 | 0.070 | 0.007 |

Comparative clear coat compositions E to G and coating compositions 10 to 14 according to the invention were spray applied on a base coat immediately after preparation as described above for compositions 5 to 8. After flash-off the panels were placed in a curing chamber having a temperature of 60° C. After 15 minutes in the curing chamber the tackiness of the warm clear coats was determined manually. This was repeated at intervals of approximately 5 minutes. When the panels did not feel tacky any more, which corresponds to drying stage 8 defined above, the panels were removed from the curing chamber. The time required to reach this drying stage is recorded in Table 7 below. Table 7 also summarizes the film appearances of the clear coats tested.

TABLE 7

|  | E | F | 10 | G | 11 | 12 | 13 | 14 |
|---|---|---|---|---|---|---|---|---|
| Curing time |  |  |  |  |  |  |  |  |
| warm tack (minutes) | 38 | 30 | 31 | 19 | 25 | 20 | 35 | 20 |
| Film appearance |  |  |  |  |  |  |  |  |
| DOI | 83 | 69 | 77 | 36 | 63 | 85 | 76 | 59 |

Examples E and F demonstrate that the curing rate of a coating composition can be increased by using a higher amount of catalyst. However, the increase in curing rate is obtained at the expense of an inferior film appearance. Example 10 only differs from Example F by the presence of a thio-functional compound. The clear coat of Example 10 according to the invention exhibits an improved balance of curing rate and film appearance. Comparative Example G shows that the curing rate can be further increased by using an even higher amount of catalyst, leading to an even more severe deterioration of the film appearance. Examples 11 to 14 demonstrate that even with the highest catalyst load an improvement of the balance of curing rate and appearance can be obtained. Whereas this improvement is also clearly visible for the tetrafunctional PTMP, even better results can be achieved with the monofunctional 1-dodecane thiol. Examples 12 to 14 demonstrate the effect of varying amounts of the thiol-functional compound. Although the improvement of the balance of curing rate and appearance is present at all levels of thiol-functional compound, in this case optimum results were obtained with the intermediate level of Example 12.

The invention claimed is:

1. A water borne coating composition comprising
a) a polyol,
b) a polyisocyanate crosslinker,
c) a thiol functional compound, and
d) a volatile component comprising water,
wherein the molar ratio of isocyanate groups to thiol groups ranges between 1:0.0001 and 1:0.4, and wherein the coating composition is curable in a temperature range of 5 to 80° C.

2. A coating composition according to claim 1 wherein the thiol-functional compound is present in a range of 0.05 to 25 weight-%, calculated on the weight of solid polyol resin.

3. A coating composition according to claim 1 wherein the thiol-functional compound is selected from the group consisting of pentaerythritol tetrakis(3-mercapto propionate), trimethylol propane tris(3-mercapto propionate), a compound of the formula $T[(C_3H_6O)_nCH_2CHXHCH_2YH]_3$, wherein T is derived from a triol such as trimethylol propane or glycerol, n is an integer between 0 and 10, X and Y are oxygen or sulphur, wherein X and Y are not equal, dodecane thiol, and dodecyl 3-mercapto propionate.

4. A coating composition according to claim 1 wherein the polyol is selected from the group consisting of polyester polyol, polyacrylate polyol, polyurethane polyol, and mixtures and hybrids thereof.

5. A coating composition according to claim 1 further comprising a metal based curing catalyst.

6. A coating composition according to claim 5 wherein the metal based curing catalyst is a tin based catalyst.

7. A coating composition according to claim 5 wherein the molar ratio of metal atoms to thiol-functional groups ranges between 1:0.5 and 1:250.

8. A clear or pigmented top coat comprising the coating composition of claim 1.

9. A multi-layer lacquer coating comprising a clear coat comprising the coating composition of claim 1.

10. A method of applying a coating composition, the method comprising:
applying the coating composition of claim 1 to a substrate, wherein the coating composition of claim 1 serves as a member of the group consisting of a primer, a filler, a base coat, and an adhesive.

11. A method of finishing or refinishing a vehicle, the method comprising:
applying the coating composition of claim 1 to a vehicle, wherein the vehicle is a member of the group consisting of an automobile and a large transportation vehicle.

12. A coating composition according to claim 2 wherein the thiol-functional compound is selected from the group consisting of pentaerythritol tetrakis(3-mercapto propionate), trimethylol propane tris(3-mercapto propionate), a compound of the formula $T[(C_3H_6O)_nCH_2CHXHCH_2YH]_3$, wherein T is derived from a triol such as trimethylol propane or glycerol, n is an integer between 0 and 10, X and Y are oxygen or sulphur, wherein X and Y are not equal, dodecane thiol, and dodecyl 3-mercapto propionate.

13. A coating composition according to claim 3 wherein the polyol is selected from the group consisting of polyester polyol, polyacrylate polyol, polyurethane polyol, and mixtures and hybrids thereof.

14. A coating composition according to claim 13 further comprising a metal based curing catalyst.

* * * * *

UNITED STATES PATENT AND TRADEMARK OFFICE
CERTIFICATE OF CORRECTION

PATENT NO.         : 8,686,103 B2                                             Page 1 of 1
APPLICATION NO.    : 11/793481
DATED              : April 1, 2014
INVENTOR(S)        : Scherer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 713 days.

Signed and Sealed this

Twenty-ninth Day of September, 2015

Michelle K. Lee
*Director of the United States Patent and Trademark Office*